US010895889B2

(12) United States Patent
Wu et al.

(10) Patent No.: US 10,895,889 B2
(45) Date of Patent: Jan. 19, 2021

(54) NOTEBOOK COMPUTER

(71) Applicants: Tung-Ying Wu, Taipei (TW);
Ming-Chung Liu, Taipei (TW);
Kuan-Chang Lee, Taipei (TW)

(72) Inventors: Tung-Ying Wu, Taipei (TW);
Ming-Chung Liu, Taipei (TW);
Kuan-Chang Lee, Taipei (TW)

(73) Assignee: COMPAL ELECTRONICS, INC.,
Taipei (TW)

( * ) Notice: Subject to any disclaimer, the term of this patent is extended or adjusted under 35 U.S.C. 154(b) by 0 days.

(21) Appl. No.: 16/239,540

(22) Filed: Jan. 4, 2019

(65) Prior Publication Data
US 2019/0212778 A1 Jul. 11, 2019

Related U.S. Application Data

(60) Provisional application No. 62/613,417, filed on Jan. 4, 2018.

(51) Int. Cl.
*G06F 1/16* (2006.01)
(52) U.S. Cl.
CPC .......... *G06F 1/1616* (2013.01); *G06F 1/1618* (2013.01); *G06F 1/1635* (2013.01); *G06F 1/1641* (2013.01); *G06F 1/1643* (2013.01); *G06F 1/1647* (2013.01); *G06F 1/1677* (2013.01); *G06F 1/1681* (2013.01)

(58) Field of Classification Search
CPC .... G06F 1/1616; G06F 1/1618; G06F 1/1641; G06F 1/1643; G06F 1/1647; G06F 1/1649
See application file for complete search history.

(56) References Cited

U.S. PATENT DOCUMENTS

| 6,642,462 | B2 * | 11/2003 | Ninomiya | ............... | H01H 3/162 |
| | | | | | 200/61.7 |
| 7,945,794 | B2 * | 5/2011 | Chen | ..................... | G06F 1/1616 |
| | | | | | 713/320 |

(Continued)

FOREIGN PATENT DOCUMENTS

| CN | 201251721 | | 6/2009 |
| CN | 201251721 Y | * | 6/2009 |

(Continued)

OTHER PUBLICATIONS

Office Action of Taiwan Counterpart Application, dated Sep. 23, 2019, p. 1-p. 7.

*Primary Examiner* — Nidhi Thaker
(74) *Attorney, Agent, or Firm* — JCIPRNET

(57) ABSTRACT

A notebook computer including a first body, a second body having a first display, a third body having a second display, a first hinge module, a second hinge module, a first electronic module, a second electronic module, and a switch module is provided. The first body and the second body rotate relatively via the first hinge module, and the second body and the third body rotate relatively via the second hinge module. The switch module is disposed in the first hinge module, and the switch module is electrically connected to and activates the first electronic module or the second electronic module depending on a rotating state of the first hinge module.

19 Claims, 10 Drawing Sheets

(56) References Cited

U.S. PATENT DOCUMENTS

| | | | | |
|---|---|---|---|---|
| 8,004,833 B2* | 8/2011 | Tseng | ................ | H04M 1/0216 |
| | | | | 361/679.55 |
| 8,047,852 B2* | 11/2011 | Sip | ................ | G06F 1/1677 |
| | | | | 361/679.28 |
| 8,184,433 B2* | 5/2012 | Lin | ................ | G06F 1/1616 |
| | | | | 361/679.55 |
| 8,203,833 B2* | 6/2012 | Huang | ................ | G06F 1/1616 |
| | | | | 361/679.2 |
| 9,869,567 B2* | 1/2018 | DiFonzo | ................ | G06F 1/3231 |
| 10,407,957 B1* | 9/2019 | Camp | ................ | F16D 13/752 |
| 2003/0218577 A1* | 11/2003 | Wang | ................ | G06F 1/1649 |
| | | | | 345/1.3 |
| 2005/0024319 A1* | 2/2005 | Amirzadeh | ................ | H04M 1/0245 |
| | | | | 345/104 |
| 2010/0079355 A1* | 4/2010 | Kilpatrick, II | ................ | G06F 1/1649 |
| | | | | 345/1.3 |
| 2012/0019444 A1* | 1/2012 | Huang | ................ | G06F 3/0202 |
| | | | | 345/168 |
| 2013/0135237 A1* | 5/2013 | Li | ................ | G03F 5/00 |
| | | | | 345/173 |
| 2014/0192017 A1* | 7/2014 | Yang | ................ | G06F 3/1423 |
| | | | | 345/174 |
| 2017/0010636 A1* | 1/2017 | Shao | ................ | G06F 1/1618 |
| 2017/0206049 A1* | 7/2017 | Choi | ................ | G06F 1/1652 |

FOREIGN PATENT DOCUMENTS

| | | |
|---|---|---|
| CN | 203930592 | 11/2014 |
| TW | 588810 | 5/2004 |
| TW | I347510 | 8/2011 |
| TW | M429903 | 5/2012 |
| TW | 201424538 | 6/2014 |
| TW | M532044 | 11/2016 |

\* cited by examiner

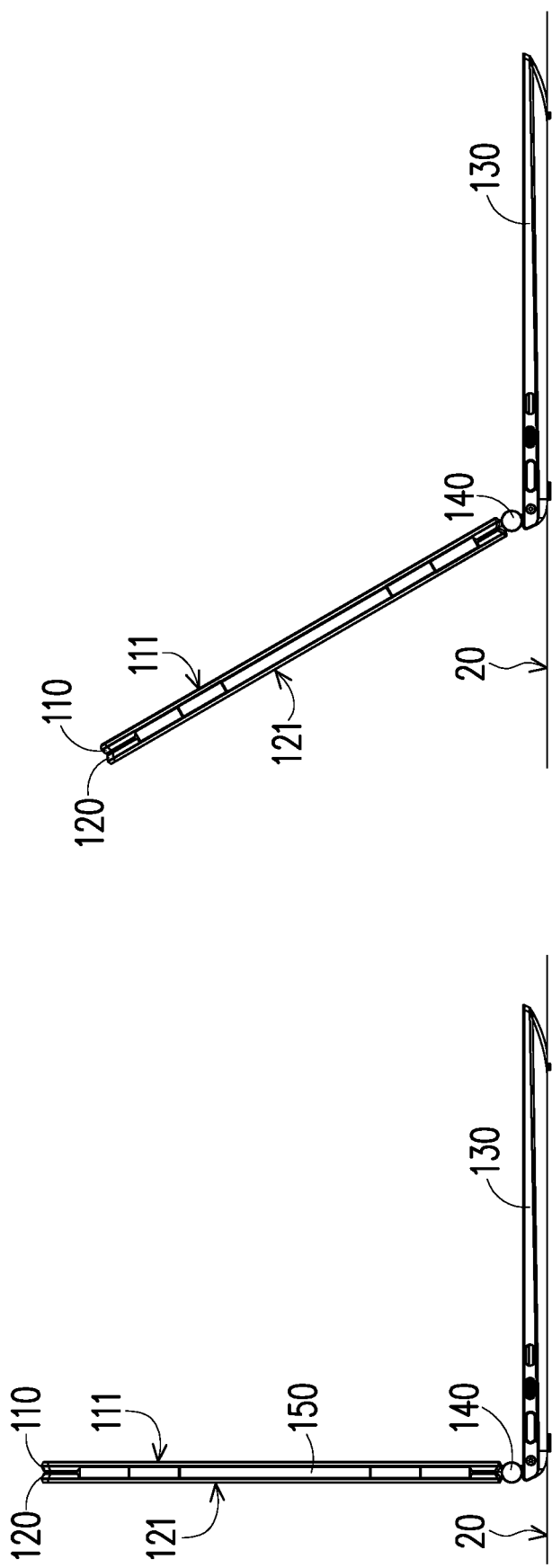

NOTEBOOK COMPUTER

CROSS REFERENCE TO RELATED APPLICATION

This application claims the priority benefit of U.S. provisional application Ser. No. 62/613,417, filed on Jan. 4, 2018. The entirety of the above-mentioned patent application is hereby incorporated by reference herein and made a part of specification.

BACKGROUND

Technical Field

The invention relates to an electronic apparatus, and more particularly, relates to a notebook computer.

Description of Related Art

Along with development of mobile information, information products such as notebook computers, cell phones, etc. have become communication tools among people, and particularly, since notebook computers feature favorable information processing capability and high mobility, notebook computers have become convenient tools used for business communications, information exchanges, issue discussions, briefing presentation, and the like.

Most of the notebook computers are designed to have one display only, and most of the displays used by the notebook computers are liquid crystal displays; nevertheless, owing to the limitation of the operating principles of the liquid crystal displays, viewing the displays with a front view is a more favorable view angle when viewing the liquid crystal displays. The liquid crystal displays satisfy the basic needs of information presentation; nevertheless, when a number of users intend to view the display information together, in order to obtain better viewing angles, the users may affect one another and inconvenience is thereby generated most of the time, and further, unfavorable viewing effects may easily be obtained because of deviation from the viewing angles.

Accordingly, how a perfect display configuration can be provided to allow a number of users to use a notebook computer together, and how a corresponding indication signal can be provided to allow the users to know the use states of the notebook computer (the display) at the moment and manners of how the notebook computer can be used, are important issues in this field.

SUMMARY

The invention provides a notebook computer having dual displays and capable of activating different electronic modules via a rotating state of a hinge module to match a state of the displays at the moment.

A notebook computer provided by an embodiment of the invention includes a first body, a second body having a first display, a third body having a second display, a first electronic module, a second electronic module, a first hinge module, a second hinge module, and a switch module. The first hinge module is disposed between the first body and the second body, so that the second body rotates relative to the first body via the first hinge module. The second hinge module is disposed between the second body and the third body, so that the third body rotates relative to the second body via the second hinge module. The first electronic module and the second electronic module are disposed in the first body or the second body. The switch module is disposed in the first hinge module, and the switch module is electrically connected to and activates the first electronic module or the second electronic module depending on a rotating state of the first hinge module.

In an embodiment of the invention, the switch module includes a first electrode, a second electrode, a third electrode, and a fourth electrode. The first electrode and the second electrode are separated from each other and fixedly surround a pivot axis of a hinge structure. The third electrode is located on the pivot axis, the fourth electrode pivots about the pivot axis, and the first electrode and the second electrode are located on a pivoting path of the fourth electrode.

In an embodiment of the invention, the first electrode and the second electrode are electrically connected to the first electronic module and the second electronic module respectively, and the third electrode and the fourth electrode are electrically conducted with each other. In a first rotating state, the fourth electrode pivots to be in contact with the first electrode to activate the first electronic module. In a second rotating state, the fourth electrode pivots to be in contact with the second electrode to activate the second electronic module.

In an embodiment of the invention, the first electrode and the second electrode are electrically connected to the first electronic module and the second electronic module respectively, and the third electrode and the fourth electrode are a pair of electric dipole of a power source. In a first rotating state, the fourth electrode pivots to be in contact with the first electrode, and the power source provides power to the first electronic module. In a second rotating state, the fourth electrode pivots to be in contact with the second electrode, and the power source provides power to the second electronic module.

In an embodiment of the invention, the first hinge module includes a first hinge and a second hinge. The first hinge is assembled to the first body, and the first electrode and the second electrode are disposed in the first hinge. The second hinge is assembled to the second body, and the third electrode and the fourth electrode are disposed in the second hinge. The second hinge and the first hinge are pivotally connected together along the pivot axis.

In an embodiment of the invention, the fourth electrode is movably disposed in the second hinge in a first axial direction, and the first electrode and the second electrode have different protruding dimensions in the first axial direction relative to a basis surface of the first hinge. When the fourth electrode is transferred from being propped against the first electrode to being propped against the second electrode, the second electrode drives the fourth electrode to move in the first axial direction, so that the fourth electrode moves away from the basis surface. The first hinge module further includes a latch member rotatably disposed in the second hinge about a second axial direction and located on a moving path of the fourth electrode. When the third body is stacked on the second body, and when the fourth electrode is driven by the second electrode to move away from the basis surface, the fourth electrode rotates the latch member to be engaged in an engaging hole of the third body.

In an embodiment of the invention, the first axial direction is parallel to the pivot axis and parallel to a normal direction of the basis surface, and the first axial direction is different from the second axial direction.

In an embodiment of the invention, in the first axial direction, the first electrode and the second electrode are located at one side of the fourth electrode, and the latch member is located at another side of the fourth electrode.

In an embodiment of the invention, the hinge structure further includes a restoring member connected between the latch member and the second hinge, and the restoring member permanently drives the latch member to move away from the engaging hole.

In an embodiment of the invention, the pivoting path of the fourth electrode is at least a portion of a circular path, and each of the first electrode and the second electrode is an arc of the circular path.

In an embodiment of the invention, arc lengths of the first electrode and the second electrode are different.

In an embodiment of the invention, the first electronic module and the second electronic module are indication elements of different types.

In an embodiment of the invention, areas of the second body and the third body are identical.

In an embodiment of the invention, when the notebook computer is in a folded state, the second body is stacked between the first body and the third body, the first display of the second body faces the first body, and the second display of the third body faces outwards and faces away from the first body and the second body.

In an embodiment of the invention, the first hinge module includes a first hinge, a second hinge, a moving member, and a latch member. The first hinge is assembled to the first body. The second hinge is assembled to the second body, both the first hinge and the second hinge pivotally connected together in a first axial direction, where a surface contour of the first hinge facing the second hinge shows varying heights in the first axial direction. The moving member is movably disposed in the second hinge in the first axial direction and pivots along with the second hinge. The moving member has a first end and a second end opposite to each other, and the first end is propped against the surface contour. The latch member is rotatably disposed in the second hinge about a second axial direction, and the latch member is located on a moving path of the second end to be driven to rotate by the moving member. When the third body is stacked on the second body and rotates relative to the first body to a predetermined state along with the second body, the moving member is driven by the surface contour to rotate the latch member, so that the latch member is engaged in an engaging hole of the third body and the third body is locked onto the second body.

In an embodiment of the invention, the first axial direction is orthogonal to the second axial direction.

In an embodiment of the invention, the hinge structure further includes a restoring member connected between the latch member and the second hinge. The restoring member permanently drives the latch member to move away from the engaging hole.

In an embodiment of the invention, the first hinge module further includes a torque assembly connected to the first hinge and the second hinge in the first axial direction, and the second hinge pivots relative to the first hinge via the torque assembly.

In an embodiment of the invention, when an unfolding angle of the second body relative to the first body is less than or equal to 90 degrees, the switch module is electrically connected to and activates the first electronic module. When the unfolding angle of the second body relative to the first body is greater than 90 degrees, the switch module is electrically connected to and activates the second electronic module.

In an embodiment of the invention, the second body has four side edges adjacent to one another to form a closed contour. The first hinge module is located at one of the side edges except the side edge adjacent to the first body.

In an embodiment of the invention, the second body has four side edges adjacent to one another to form a closed contour. The first hinge module is located at a first side edge adjacent to the first body, and the second hinge module is located at a second side edge or a third side edge adjacent to the first side edge.

To sum up, the notebook computer have dual displays of the same areas, and the third body having the second display is pivotally connected onto the second body having the first display, so as to pivot and be unfolded and folded along with the second body, and therefore, in the operating process, indication is required to be provided to the user via the first electronic module and the second electronic module, so as to remind the user to operate the bodies in an appropriate manner at the moment, and the damage of the bodies owing to improper operations may be prevented. Accordingly, the first hinge module is disposed between the second body and the first body, and the switch module is disposed in the first hinge module to correspond to the rotating state of the first hinge module, so the first electronic module or the second electronic module may accordingly be activated, and the user is thereby reminded.

To make the aforementioned more comprehensible, several embodiments accompanied with drawings are described in detail as follows.

BRIEF DESCRIPTION OF THE DRAWINGS

FIG. 1D and FIG. 1E are side views of the notebook computer in different states.

DESCRIPTION OF THE EMBODIMENTS

Figure 1A:
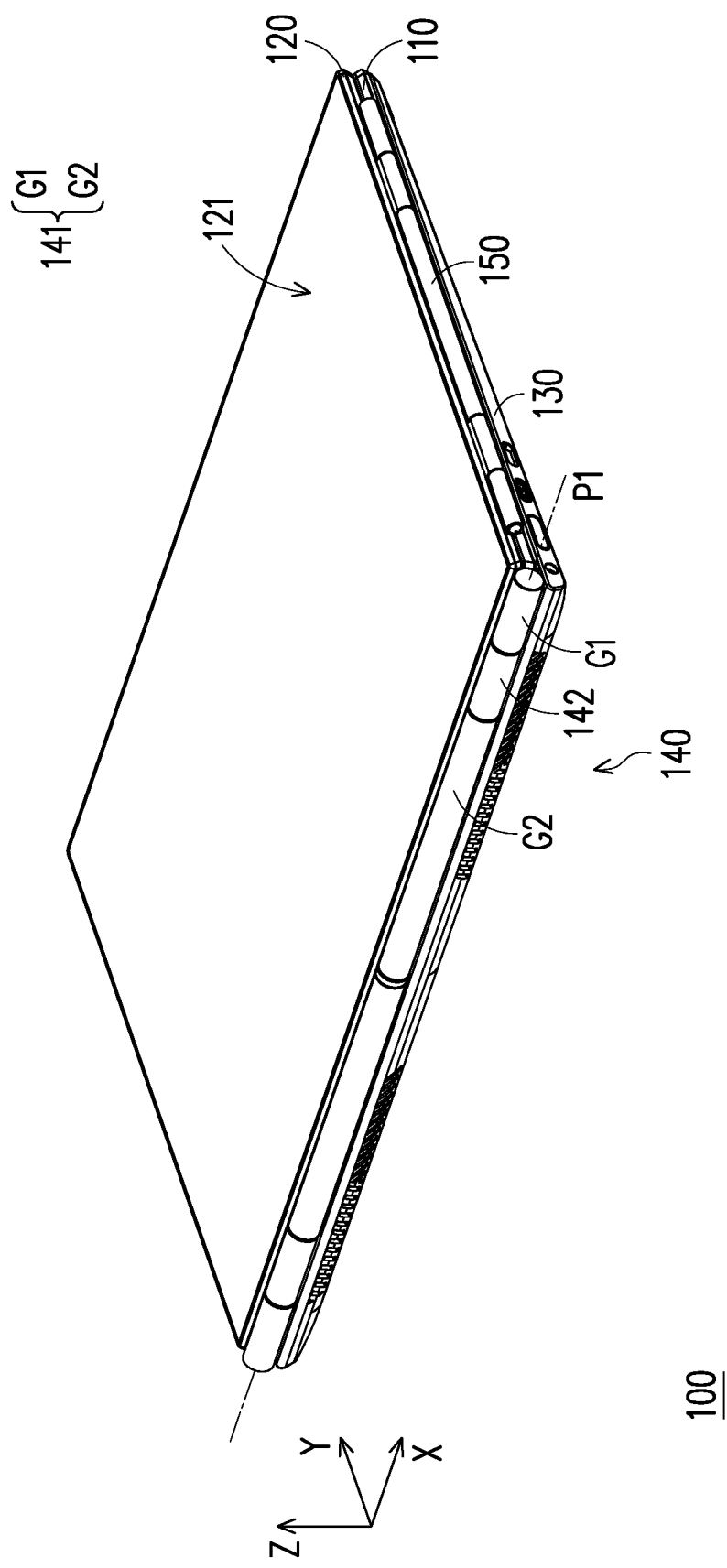
FIG. 1A is a schematic view of a notebook computer according to an embodiment of the invention.
Figure 1B:
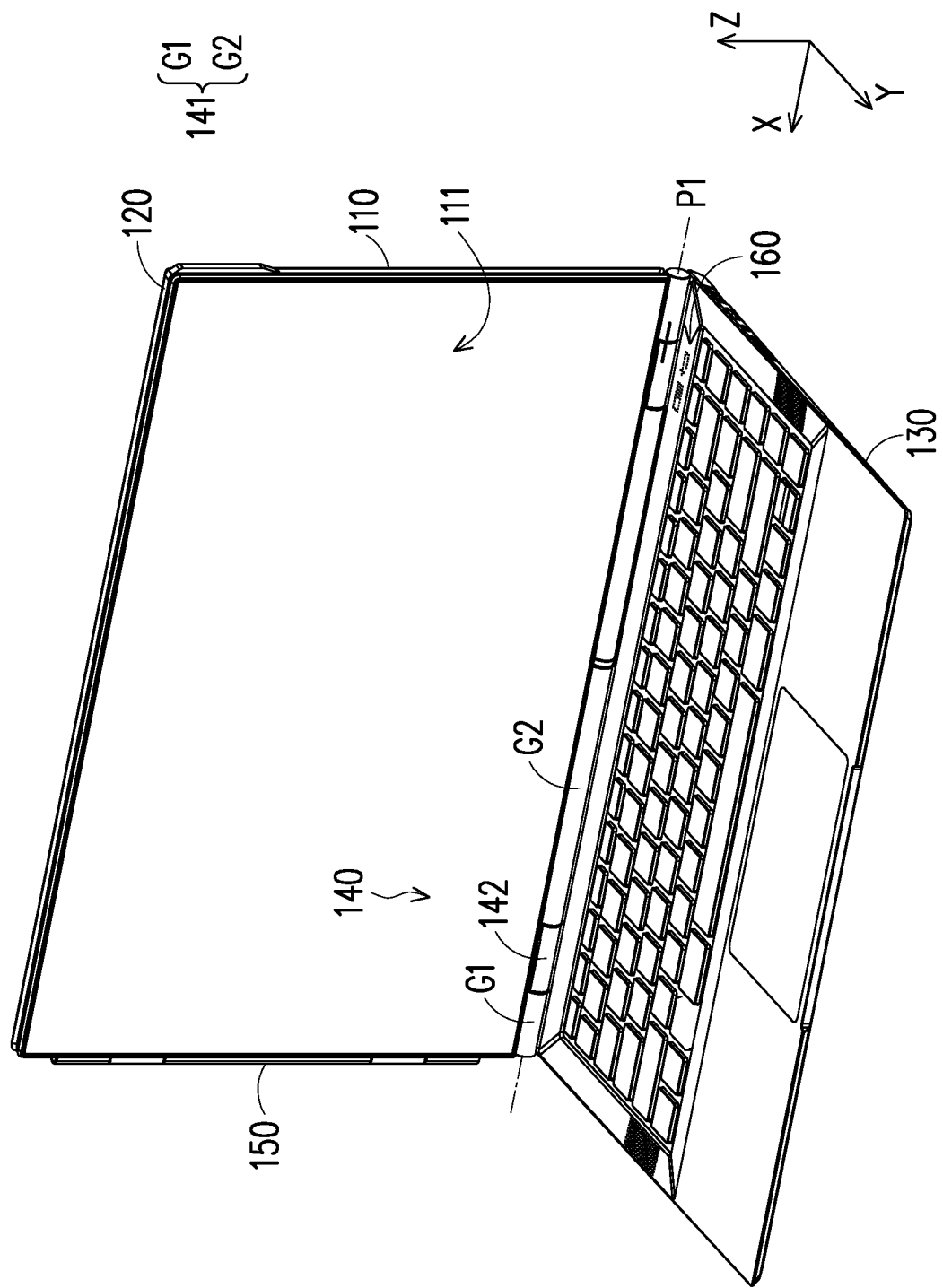
FIG. 1B and FIG. 1C are schematic views illustrating the notebook computer of FIG. 1A in different states.
Figure 1C:
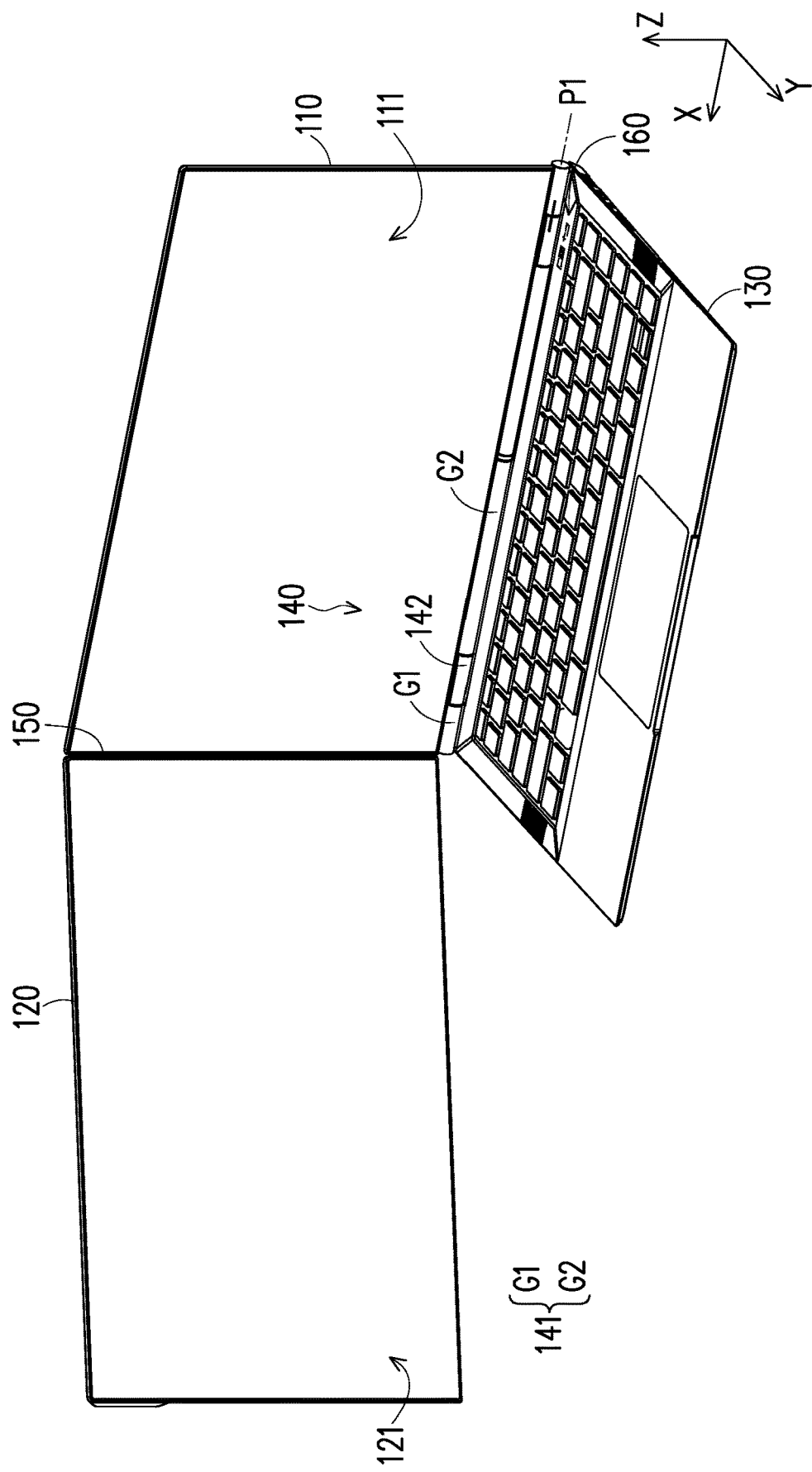

FIG. 1A is a schematic view of a notebook computer according to an embodiment of the invention. FIG. 1B and FIG. 1C are schematic views illustrating the notebook computer of FIG. 1A in different states. Further, a Cartesian coordinate X-Y-Z is provided in related drawings for ease of description. With reference to FIG. 1A to FIG. 1C, in this embodiment, a notebook computer 100 includes a second body 110, a third body 120, a first body 130, a first hinge module 140, and a second hinge module 150, where the first body 130 is, for example, a system host of the notebook computer 100, and the second body 110 is connected to the first body 130 via the first hinge module 140, as such the second body 110 may pivot to be unfolded and folded relative to the first body 130, the third body 120 may be connected to the second body 110 via the second hinge module 150, so that the third body 120 may pivot to be unfolded and folded relative to the second body 110.

As shown in FIG. 1A, when the notebook computer 100 is in a folded state, the second body 110 is stacked between the first body 130 and the third body 120, a first display 111 (marked in FIG. 1B and FIG. 1C owning to viewing angle) of the second body 110 faces the first body 130, and a second display 121 of the third body 120 faces outwards and faces away from the first body 130. The second display 121 of the third body 120 is exposed at the moment, so that the notebook computer 100 may be used as a tablet computer in an operating mode by a user through operating the third body 120.

Next, as shown in FIG. 1B, since the third body 120 is assembled to a side edge of the second body 110 via the second hinge module 150, when the second body 110 is converted from the folded state to the state shown in FIG. 1B, the third body 120 pivots to be unfolded relative to the first body 130 along with the second body 110 but is still stacked onto the second body 110. The first display 111 of the second body 110 and the second display 121 of the third body 120 are both exposed at the moment, so that the notebook computer 100 may be used by a number of users facing one another at the same time and in a presentation mode.

Next, as shown in FIG. 1C, the third body 120 may be flipped from a back surface of the second body 110 via the second hinge module 150, so that the users may use the notebook computer 100 in the same direction at the same time, and that viewing angles are prevented from being limited as described above when only a single display is provided for viewing.

It is worth noting that pivoting states of the second body 110 and the third body 120 described above are exemplary only, and unfolding angles are not limited in this regard. Further, in this embodiment, the second body 110 has four side edges adjacent to one another to form a closed contour, where the first hinge module 140 configured to connect the first body 130 and the second body 110 is located at the side edge adjacent to the first body 130 among the side edges, the second hinge module 150 is located at one side edge among the rest of the three side edges, and as shown in FIG. 1C, the third body 120 is pivotally connected at the left side edge of the second body 110, and certainly, in other embodiments, the third body 120 may be pivotally connected to the right side edge or the top side edge of the second body 110 via the second hinge 150.

Further, areas of the second body 110 and the third body 120 are identical in this embodiment, so that a single user or a number of users may enjoy a more convenient viewing and identifying experience, but conversion operations among the foregoing different states are required to be further limited. Specifically, FIG. 1D and FIG. 1E are side views of the notebook computer in different states. With reference to FIG. 1D and FIG. 1E together, in this embodiment, when the notebook computer 100 is placed on a platform 20, since the second body 110 and the third body 120 are substantially members having identical areas, in the state shown in FIG. 1D, the third body 120 may still be flipped out from the back surface (facing away from the first display 111) of the second body 110 via the second hinge module 150, and that is to say, sufficient space is provided at the back surface of the second body 110 for flipping the third body 120 at this moment. In contrast, as shown in FIG. 1E, when the unfolding angle of the notebook computer 100 is greater than the 90-degree angle shown in FIG. 1D, sufficient space is no longer provided at the back surface of the second body 110 for flipping the third body 120. Accordingly, in a structure and corresponding operations of the notebook computer 100, an indication function is required to be provided for reminding the user, or a related fool-proof mechanism is required to be provided, so that in the state shown in FIG. 1E, the user may be prevented from inadvertently flipping the third body 120, which may cause the third body 120 to collide and to be damaged.

Figure 2A:
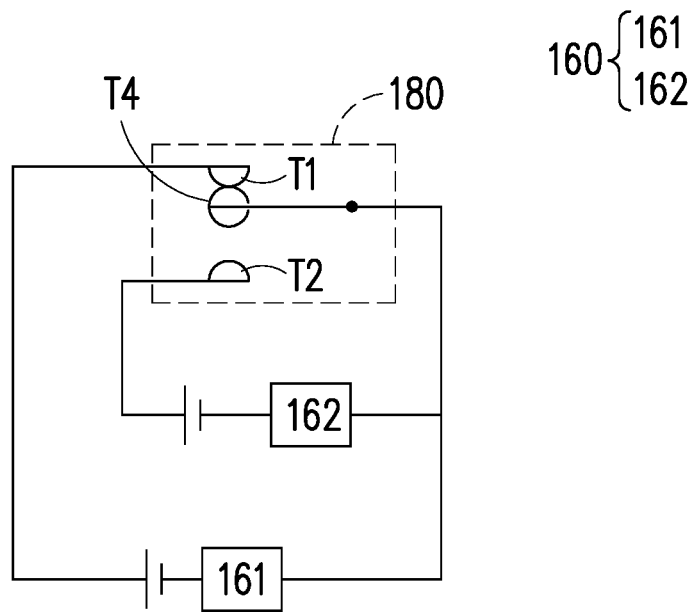
FIG. 2A and FIG. 2B are schematic circuit diagrams illustrating electronic modules in the notebook computer in different states.
Figure 2B:
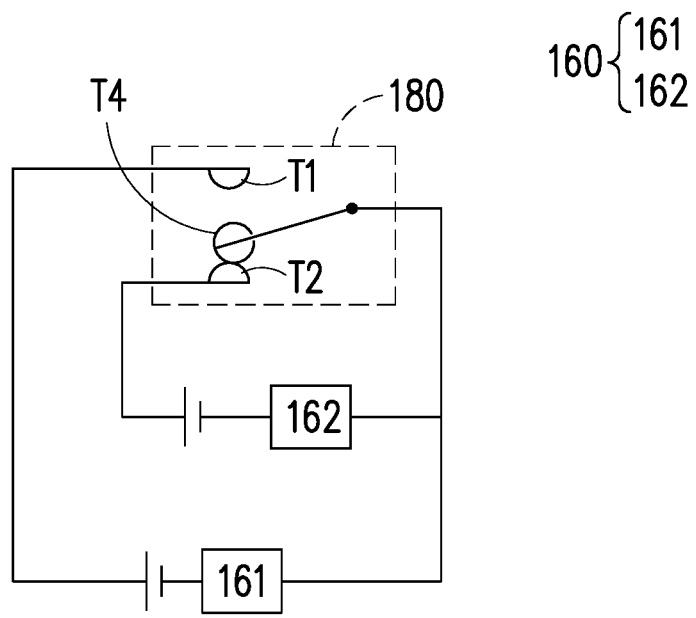

FIG. 2A and FIG. 2B are schematic circuit diagrams illustrating electronic modules in the notebook computer in different states. Based on the above reasons, with reference to FIG. 1B, FIG. 2A, and FIG. 2B together, an indication device 160 is further disposed in the notebook computer 100 of this embodiment, such as a light signal device located on the first body 130, a first electronic module 161 and a second electronic module 162 of different types are also included, such as light signals having different colors or different patterns, and the electronic modules are configured to act as indication elements for reminding the user. Correspondingly, the notebook computer 100 also includes a switch module 180 disposed in the first hinge module 140, and the switch module 180 is electrically connected to the first electronic module 161 or the second electronic module 162 correspondingly. When the second body 110 (and the third body 120 disposed thereon) is unfolded relative to the first body 110 via the first hinge module 140, the switch module 180 corresponds to a rotating state of the first hinge module 140 to correspondingly activate the first electronic module 161 or the second electronic module 162, such as generating light signals of different colors or patterns to remind the user of the unfolding and folding states of the notebook computer 100 at the moment.

Figure 3A:
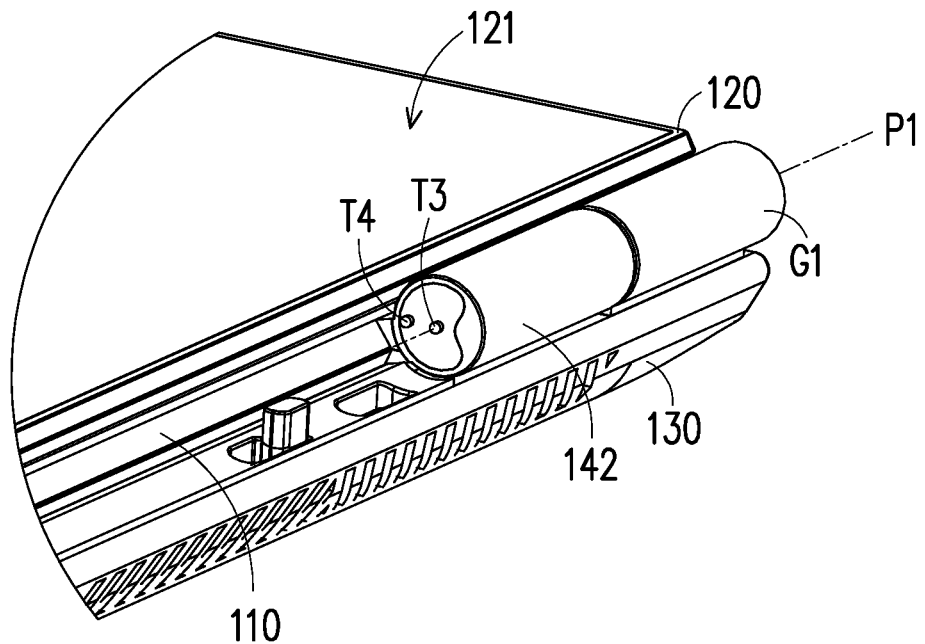
FIG. 3A and FIG. 3B are local schematic views illustrating the notebook computer of FIG. 1A.
Figure 3B:
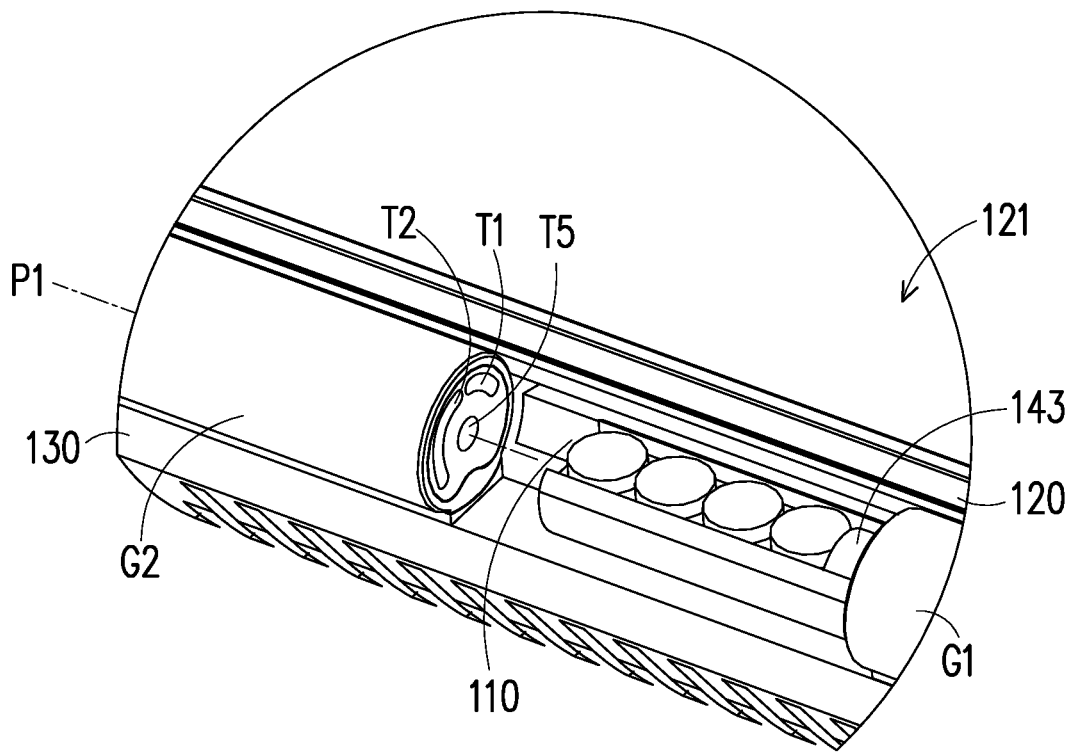
Figure 4A:
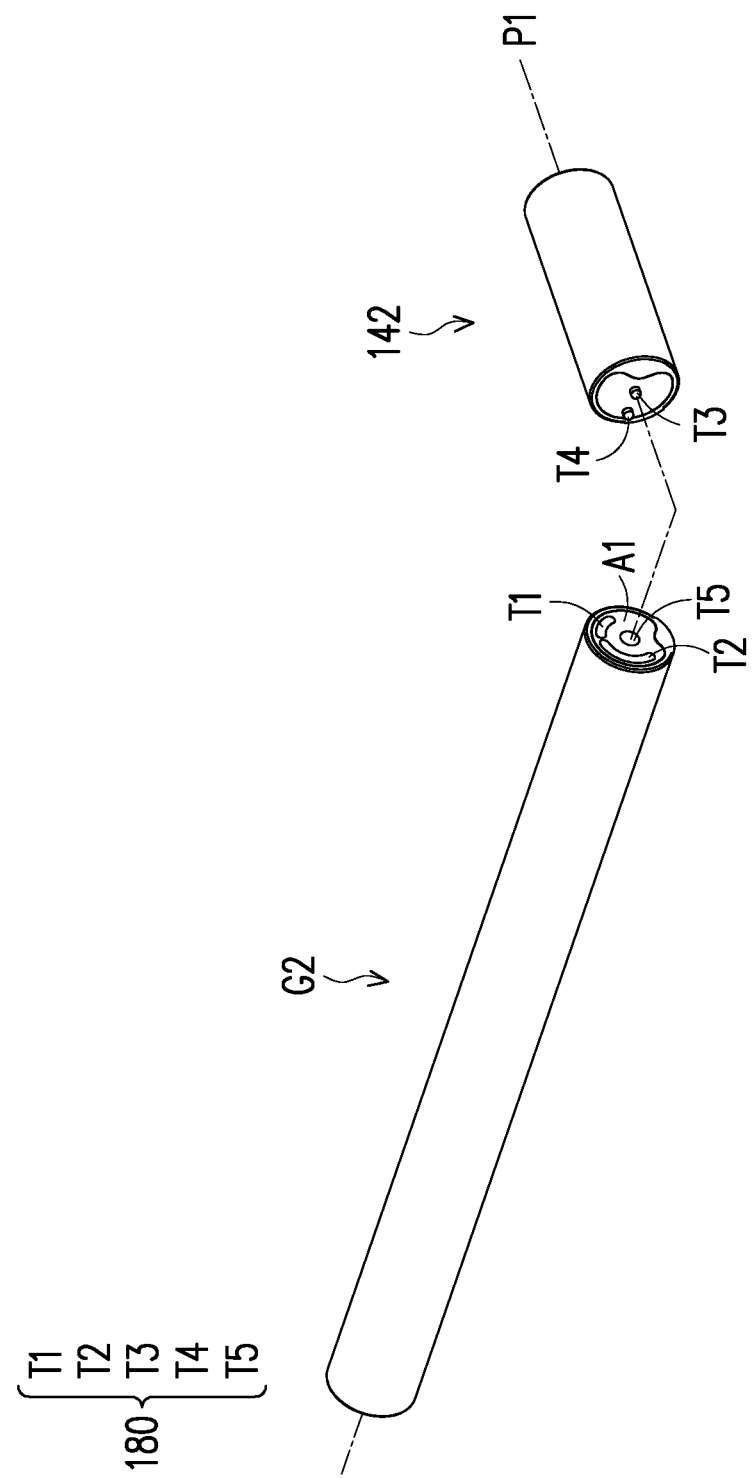
FIG. 4A and FIG. 4B are schematic views corresponding to a first hinge and a second hinge.
Figure 4B:
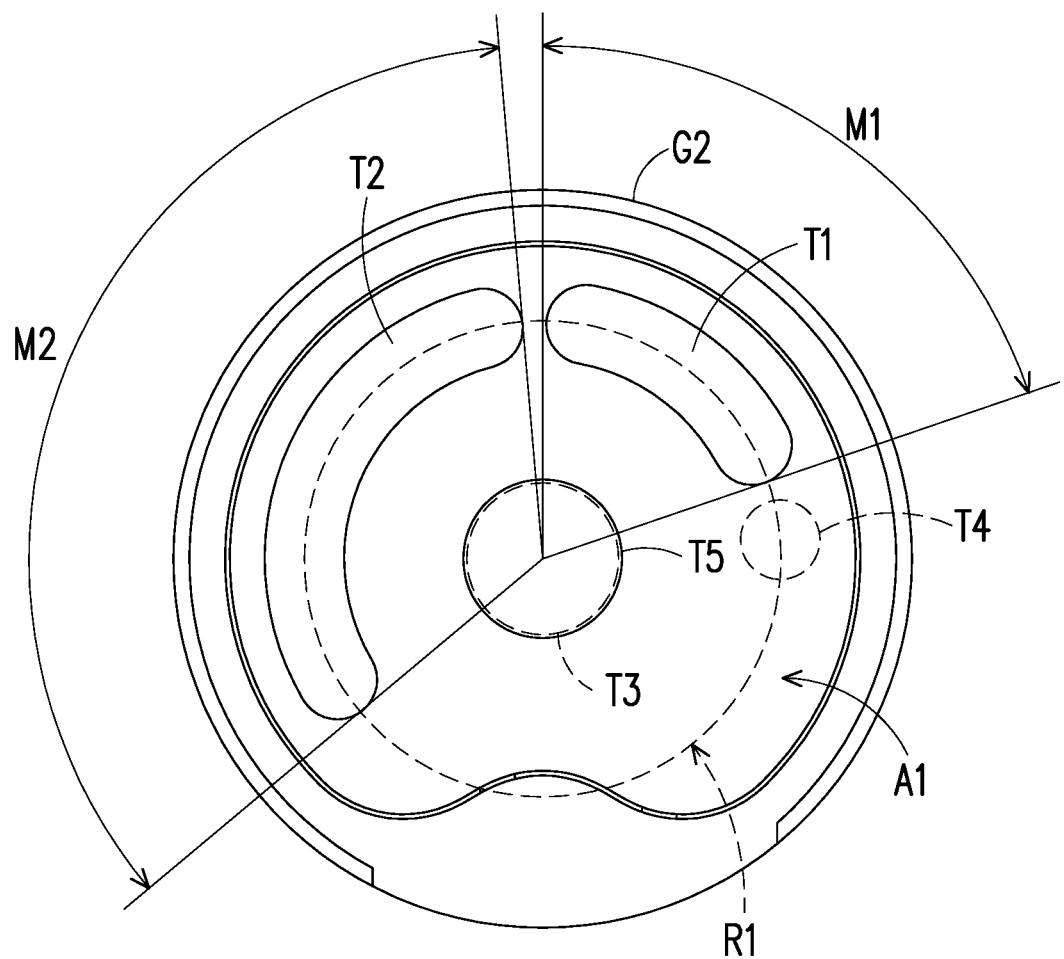

The switch module 180 of this embodiment is described in detail as follows. FIG. 3A and FIG. 3B are local schematic views illustrating the notebook computer of FIG. 1A. FIG. 4A and FIG. 4B are schematic views corresponding to a first hinge and a second hinge. With reference to FIG. 3A, FIG. 3B, and FIG. 4A first, in this embodiment, the first hinge module 140 includes a first hinge 141 and a second hinge 142, where the first hinge 141 is assembled to the first body 130 and is divided into components G1 and G2 by the second hinge 142. It can be clearly seen from FIG. 3A and FIG. 3B that the components G1 and G2 of the first hinge 141 and the first body 130 substantially form an integral structure. The second hinge 142 is assembled to the second body 110, both the second hinge 142 and the first hinge 141 are pivotally connected together along a pivot axis P1, and the second hinge 142 and the second body 110 form an integral structure as shown in FIG. 3A. As shown in FIG. 1A to FIG. 1C, the pivot axis P1 is parallel to the X axis, the first hinge module 140 further includes a torque assembly 143 connected to the first hinge 141 and the second hinge 142 along the pivot axis P1, that is, a securing portion (not shown) of the torque assembly 143 is disposed in the component G1, and a pivoting portion (not shown) extends from the securing portion to the second hinge 142, so that the second hinge 142 pivots relative to the first hinge 141 via the torque assembly 143 and accordingly generates a supporting force required to support the second body 110 and the third body 120. Herein, the torque assembly 143 may be a torque assembly used in existing hinge structures, so that related description is not provided.

More importantly, the switch module 180 includes a first electrode T1, a second electrode T2, a third electrode T3, a fourth electrode T4, and a fifth electrode T5, and as shown in FIG. 3B and FIG. 4A, the first electrode T1 and the second electrode T2 are separately disposed in the component G2 of the first hinge 141 and surrounds the pivot axis P1, where as shown in FIG. 3A and FIG. 3B, when the third body 120 is stacked on the first body 130 along with the second body 110, so that the notebook computer 100 is in the folding state, the first electrode T1 is closer to the first display 111 and the second display 121 than the second electrode T2. The third electrode T3 and the fourth electrode T4 are disposed in the second hinge 142, where the third electrode T3 is located on the pivot axis P1, the fourth electrode T4 pivots about the pivot axis P1, and the first electrode T1 and the second electrode T2 are located on a pivoting path of the fourth electrode T4. In other words, when the second body 110 (and the third body 120 disposed thereon) pivots relative to the first body 130 to be unfolded and folded via the first hinge module 140, the second hinge 142 is also enabled together to drive the fourth electrode T4 to rotate about the pivot axis P1, and since the third electrode T3 is located on the pivot axis P1, the third electrode T3 is in a self-rotating state. Correspondingly, the first electrode T1 and the second electrode T2 are secured onto the first body 130 along with the component G2 of the first hinge 141 (as shown in FIG. 3B), so that the fourth electrode T4 may be propped against the first electrode T1 or the second electrode T2 in the pivoting process.

With reference to FIG. 2A, FIG. 2B and FIG. 4A again, in this embodiment, the first electrode T1 and the second electrode T2 are electrically connected to the first electronic module 161 and the second electronic module 162 respectively, and the third electrode T3 and the fourth electrode T4 are electrically conducted with each other. Hence, in a first rotating state, the fourth electrode T4 pivots to be in contact with the first electrode T1 to activate the first electronic module 161, and in a second rotating state, the fourth electrode T4 pivots to be in contact with the second electrode T2 to activate the second electronic module 162. Further, in an example, the third electrode T3 and the fourth electrode T4 are a pair of electric dipole (positive and negative electrodes) of a power source, and thereby in the first rotating state, the fourth electrode T4 pivots to be in contact with the first electrode T1, so that the power source provides power to the first electronic module 161, and in the second rotating state, the fourth electrode T4 pivots to be in contact with the second electrode T2, so that the power source provides power to the second electronic module 162.

With reference to FIG. 4B, a side surface (facing the second hinge 142, as shown in FIG. 4A) of the component G2 of the first hinge 141 having the first electrode T1 and the second electrode T2 disposed thereon acts as a basis surface A1, and the third electrode T3 and the fourth electrode T4 are schematically depicted on the basis surface A1 correspondingly. Based on the foregoing member arrangement, it can be clearly seen that when the second hinge 142 pivots about the pivot axis P1, the third electrode T3 is butted to the fifth electrode T5, the third electrode T3 performs self-rotating on the pivot axis P1 only, and the fourth electrode T4 rotates around the pivot axis P1, so as to form a pivoting path R1 shown in FIG. 4B, and therefore in a first rotating state M1, the fourth electrode T4 and the first electrode T1 are propped against each other to be electrically conducted, and in a second rotating state M2, the fourth electrode T4 and the second electrode T2 are propped against each other to be electrically conducted, so as to be switched between the circuit states shown in FIG. 2A and FIG. 2B.

In this embodiment, the pivoting path R1 of the fourth electrode T4 is at least a portion of a circular path, each of the first electrode T1 and the second electrode T2 is an arc of the circular path, and arc lengths of the first electrode T1 and the second electrode T2 are different. In this way, after the notebook computer 100 is unfolded at an angle greater than 90 degrees, the fourth electrode T4 and the second electrode T2 are maintained to be electrically conducted, so as to remind the user through the second electronic module 162. In an embodiment, the arc length of the first electrode T1 is less than the arc length of the second electrode T2. For instance, when the notebook computer 100 begins to be unfolded from the folded state (considered as 0 degree), an inscribed angle corresponding to the arc length of the first electrode T1 may correspond to the unfolding angle of the notebook computer 100 of 45 degrees to 90 degrees, so that the first electronic module 161 is activated at the moment (the first rotating state MD, and a green-light signal is presented. Next, an inscribed angle corresponding to the arc length of the second electrode T2 may correspond to the unfolding angle of the notebook computer 100 of 90 degrees to 180 degrees, so that the second electronic module 162 is activated at the moment (the second rotating state M2), and a red-light signal is presented. In other words, with reference to FIG. 1D and FIG. 1E, where FIG. 1D depicts that the unfolding angle of the notebook computer 100 is 90 degrees, and FIG. 1E depicts that the unfolding angle is greater than 90 degrees, so that the notebook computer 100 with the unfolding angle of greater than 90 is presented in, for example, FIG. 1E, and the space at the back surface of the second body 110 is not large enough for the user to flip the third body 120 out. It is worth noting that the arc lengths of the first electrode T1 and the second electrode T2 and the relationship between corresponding positions of the first electrode T1 or the second electrode T2 and the fourth electrode T4 may all be appropriately adjusted according to the feature of the first hinge module 140 or the requirement of unfolding or folding the notebook computer 100, so that the first rotating state M1 or/and the second rotating state M2 as required is/are generated.

In addition to the above indication elements (the first electronic module 161 and the second electronic module 162) configure to remind the user, a fool-proof mechanism is further provided by the invention for forcing the third body 120 to be secured to the second body 110 when insufficient space is provided for flipping to the notebook computer 100, so as to prevent the user from flipping the third body 120 which may cause unnecessary collision and damage.

Figure 5A:
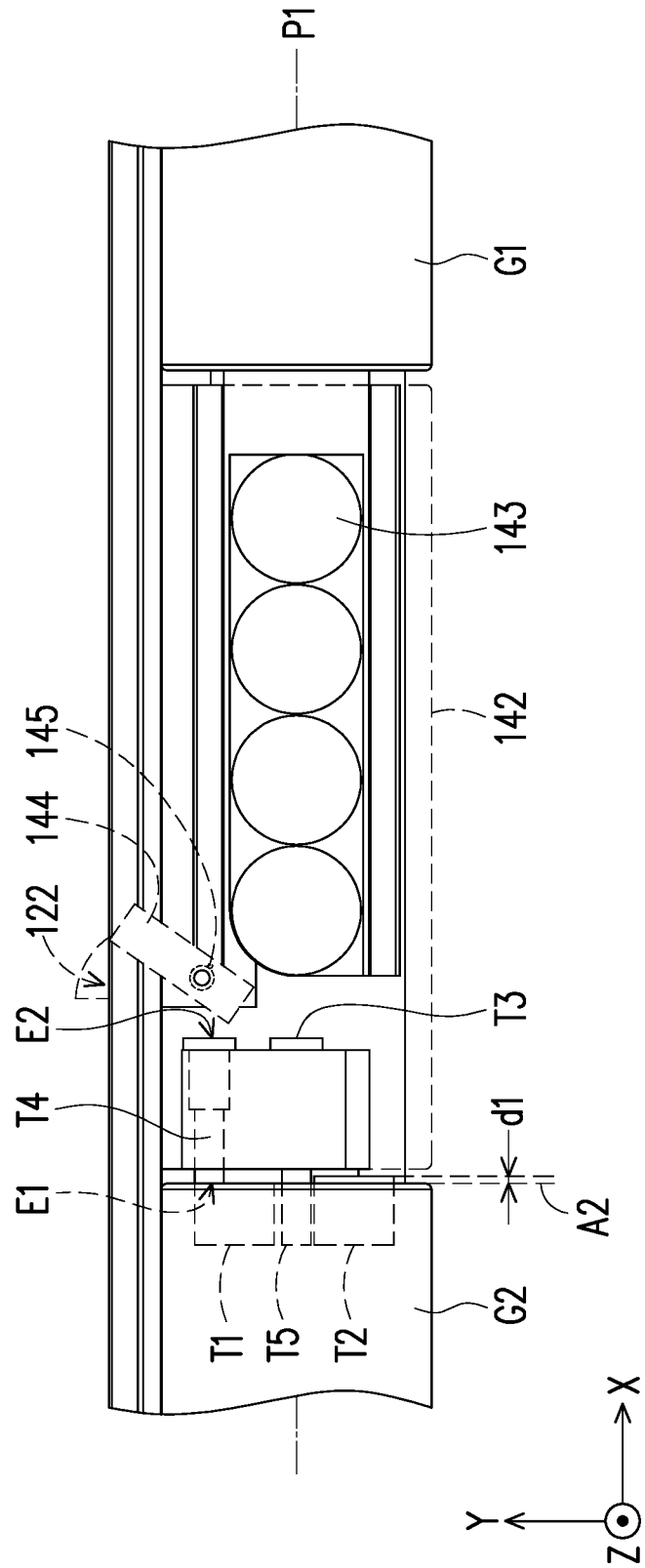
FIG. 5A is a local schematic view of the notebook computer according to another embodiment of the invention.
Figure 5B:
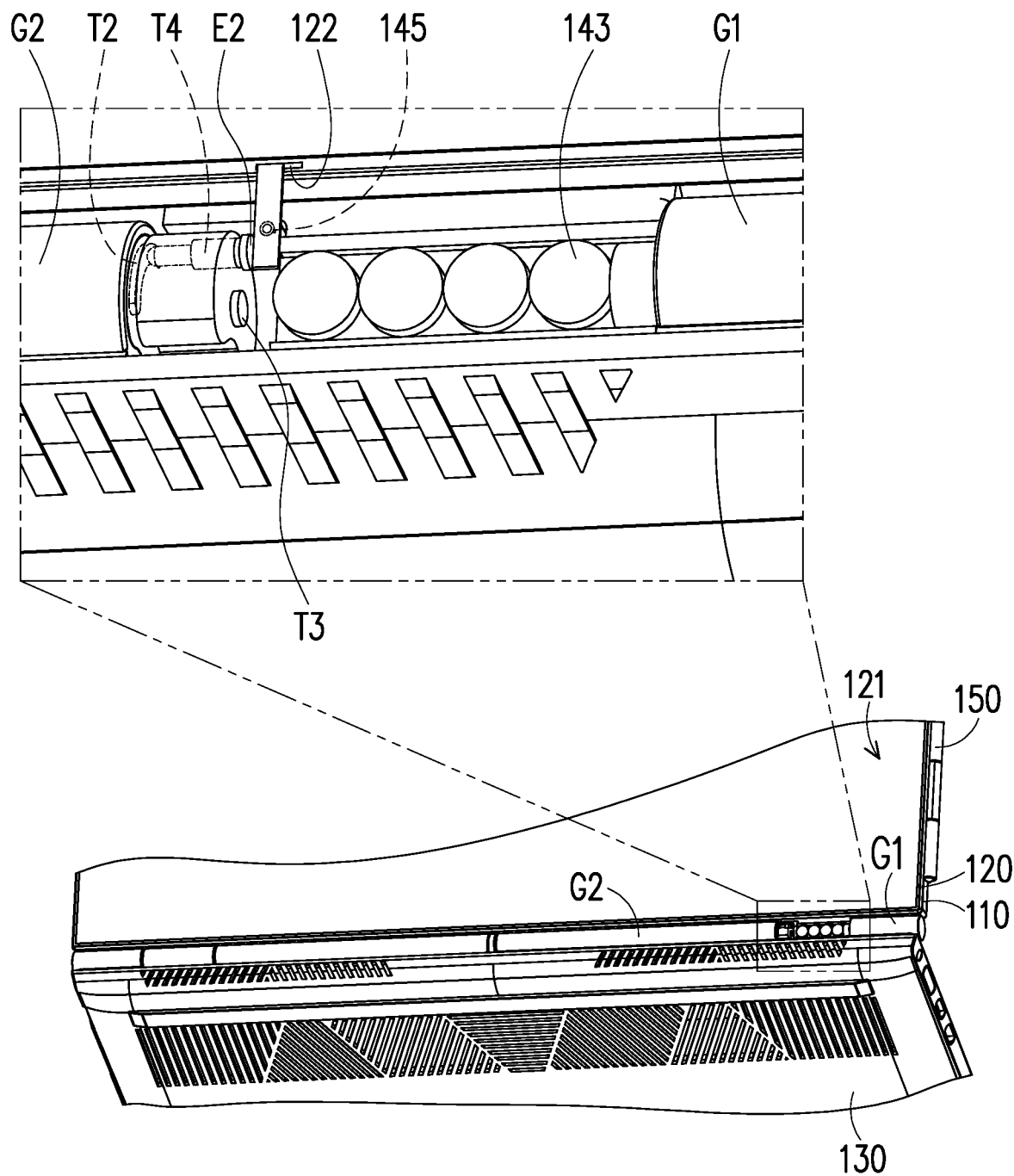
FIG. 5B is a schematic view illustrating the notebook computer of FIG. 5A in another state.

FIG. 5A is a local schematic view of the notebook computer according to another embodiment of the invention, and FIG. 5B is a local schematic view illustrating the notebook computer of FIG. 5A in another state, where FIG. 5A is a top view illustrating a portion of the notebook computer 100 in the state shown in FIG. 3B. With reference to FIG. 5A and FIG. 5B, in this embodiment, the fourth electrode T4 is, for example, a column body, and is movably disposed in the second hinge 142 along the X axis, and the first electrode T1 and the second electrode T2 have different protruding dimensions along the X axis relative to an opposite basis surface A2 of the component G1 of the first hinge 141. It is noted that the first electrode T1 is flushed with the basis surface A2, and a protruding dimension dl of the second electrode T2 opposite to the basis surface A2 is taken as an example, but the invention is not limited thereto. When the fourth electrode T4 is transferred from being propped against the first electrode T1 to being propped against the second electrode T2, the second electrode T2 drives the fourth electrode T4 to move along the X axis, so that the fourth electrode T4 moves away from the basis surface A2.

Correspondingly, the first hinge module 140 of this embodiment further includes a latch member 144 rotatably disposed in the second hinge 142 along the Z axis and is located on a moving path of the fourth electrode T4 (along the X axis), and the X axis may be treated as a normal direction of the basis surface A2. Hence, when the third body 120 is stacked on the second body 110, and when the fourth electrode T4 is driven by the second electrode T2 to move away from the basis surface A2 as described above, the fourth electrode T4 drives the latch member 144 to rotate and to be engaged in an engaging hole 122 of the third body 120, as shown in FIG. 5B.

In other words, the fourth electrode T4 is treated as a moving member capable of moving in the second hinge 142 along the X axis, and since a surface contour of the component G2 of the first hinge 141 shows varying heights at a side surface (the basis surface A2) of the component G2 at the moment, that is, varying heights are shown on the X axis. A first end E1 of the fourth electrode T4, the first electrode T1, and the second electrode T2 are located on the same side of the fourth electrode T4 and propped against the surface contour of the component G2 at the side surface. Therefore, the first end E1 of the fourth electrode T4, the first electrode T1, and the second electrode T2 may move along the X axis along with the varying heights. Accordingly, a second end E2 located on another side of the fourth electrode T4 can accordingly drive the latch member 144 located at the another side of the fourth electrode T4 to rotate around the Z axis, so that when the fourth electrode T4 is transferred to be propped against the second electrode T2, the latch member 144 is engaged in the engaging hole 122 of the third body 120. In this way, in the state as shown in FIG. 1E, through interference provided by the latch member 144 and the engaging hole 122, the third body 120 and the second body 110 are locked together, so that in this state, the user is effectively prevented from mistakenly flipping the third body 120.

In addition, the first hinge module 140 further includes a restoring member 145, such as a torsion spring, configured to be connected between the latch member 144 and the second hinge 142, and the restoring member 145 permanently drives the latch member 144 to move away from the engaging hole 122. That is, when the fourth electrode T4 is transferred back to be propped against the first electrode T1 along with the second hinge 142, for the fourth electrode T4, a driving force from the second electrode T2 no longer exists, so that the restoring member 145 drives the latch member 144 to move away from the engaging hole 122, that is, the latch member 144 further drives the fourth electrode T4 to move in a direction of the negative X axis until the fourth electrode T4 is propped against the first electrode T1 and is restored again. In other words, as shown in FIG. 1D, when the unfolding angle of the notebook computer 100 is less than or equal to 90 degrees, the space at the back surface of the second body 110 is large enough to allow the third body 120 to be flipped out, and the interference between the latch member 144 and the engaging hole 122 is thereby relieved, and that the user may freely flip the third body 120.

Note that, regardless of the reminding function provided to the user through the indication element 160 or the interference between the latch member 144 and the engaging hole 122 to force the third body 120 to be locked onto the second body 110, both means can be selectively adapted to the notebook computer 100 provided by the invention. That is, in a design phase, a designer may select at least one of the means to allow the notebook computer 100 of the invention having dual displays of the same areas to provide users a more favorable and secure operating experience.

In view of the foregoing, in the embodiments of the invention, the notebook computer has dual bodies/dual displays of the same areas, and the third body having the second display is pivotally connected onto the second body having the first display, so as to pivot and be unfolded and folded along with the second body, and hence in the operating process, whether the third body is operable depends on the unfolding angle between the second body and the first body. Accordingly, the switch module is disposed in the first hinge module of the notebook computer to correspond to the rotating state of the first hinge module, and the first electronic module or the second electronic module is accordingly activated, so the user is reminded.

Further, the latch member is further disposed in the first hinge module of the notebook computer, so the latch member is driven by the rotating state of the first hinge module, and that the latch member may be locked to or released from the third body. That is, in the certain rotating state, the interference state between the latch member and the third body provides a fool-proof mechanism, so that the third body and the second body are locked together, and the user is prevented from mistakenly flip the third body out.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A notebook computer, comprising
   a first body;
   a second body, having a first display;
   a first hinge module, disposed between the first body and the second body, and the second body being rotated relative to the first body via the first hinge module;
   a third body, having a second display;
   a second hinge module, disposed between the second body and the third body, and the third body being rotated relative to the second body via the second hinge module;
   a first electronic module and a second electronic module, disposed in the first body or the second body; and
   a switch module, disposed in the first hinge module, the switch module electrically connected to and activating the first electronic module or the second electronic module depending on a rotating state of the first hinge module,
   wherein when an unfolding angle of the second body relative to the first body is less than or equal to 90 degrees, the switch module is electrically connected to and activates the first electronic module, and when the unfolding angle of the second body relative to the first body is greater than 90 degrees, the switch module is electrically connected to and activates the second electronic module, and
   the switch module comprises a first electrode, a second electrode, a third electrode, and a fourth electrode, the first electrode and the second electrode are separated from each other and fixedly surround a pivot axis of the second hinge module, the third electrode is located on the pivot axis, the fourth electrode pivots about the pivot axis, and the first electrode and the second electrode are located on a pivoting path of the fourth electrode.

2. The notebook computer as claimed in claim 1, wherein the first electrode and the second electrode are electrically connected to the first electronic module and the second electronic module respectively, the third electrode and the fourth electrode are electrically conducted with each other, in a first rotating state, the fourth electrode pivots to be in contact with the first electrode to activate the first electronic module, and in a second rotating state, the fourth electrode pivots to be in contact with the second electrode to activate the second electronic module.

3. The notebook computer as claimed in claim 1, wherein the first electrode and the second electrode are electrically connected to the first electronic module and the second electronic module respectively, the third electrode and the fourth electrode are a pair of electric dipole of a power source, in a first rotating state, the fourth electrode pivots to be in contact with the first electrode, the power source provides power to the first electronic module, in a second rotating state, the fourth electrode pivots to be in contact with the second electrode, and the power source provides power to the second electronic module.

4. The notebook computer as claimed in claim 1, wherein the first hinge module comprises:
a first hinge, assembled to the first body, the first electrode and the second electrode disposed in the first hinge; and
a second hinge, assembled to the second body, the third electrode and the fourth electrode disposed in the second hinge, the second hinge and the first hinge pivotally connected together along the pivot axis.

5. The notebook computer as claimed in claim 4, wherein the fourth electrode is movably disposed in the second hinge in a first axial direction, the first electrode and the second electrode have different protruding dimensions in the first axial direction relative to a basis surface of the first hinge, when the fourth electrode is transferred from being propped against the first electrode to being propped against the second electrode, the second electrode drives the fourth electrode to move in the first axial direction, so that the fourth electrode moves away from the basis surface, and the first hinge module further comprises:
a latch member, rotatably disposed in the second hinge about a second axial direction, located on a moving path of the fourth electrode, when the third body is stacked on the second body, and when the fourth electrode is driven by the second electrode to move away from the basis surface, the fourth electrode rotates the latch member to be engaged in an engaging hole of the third body.

6. The notebook computer as claimed in claim 5, wherein the first axial direction is parallel to the pivot axis and parallel to a normal direction of the basis surface, and the first axial direction is different from the second axial direction.

7. The notebook computer as claimed in claim 5, wherein in the first axial direction, the first electrode and the second electrode are located at one side of the fourth electrode, and the latch member is located at another side of the fourth electrode.

8. The notebook computer as claimed in claim 5, wherein the first hinge module further comprises:
a restoring member, connected between the latch member and the second hinge, the restoring member permanently driving the latch member to move away from the engaging hole.

9. The notebook computer as claimed in claim 1, wherein the pivoting path of the fourth electrode is at least a portion of a circular path, and each of the first electrode and the second electrode is an arc of the circular path.

10. The notebook computer as claimed in claim 9, wherein arc lengths of the first electrode and the second electrode are different.

11. The notebook computer as claimed in claim 1, wherein the first electronic module and the second electronic module are indication elements of different types.

12. The notebook computer as claimed in claim 1, wherein areas of the second body and the third body are identical.

13. The notebook computer as claimed in claim 1, when the notebook computer is in a folded state, the second body stacked between the first body and the third body, the first display of the second body facing the first body, and the second display of the third body facing outwards and facing away from the first body and the second body.

14. The notebook computer as claimed in claim 1, wherein the second body has four side edges adjacent to one another to form a closed contour, and the second hinge module is located at one of the side edges except the side edge adjacent to the first body.

15. The notebook computer as claimed in claim 1, wherein the second body has four side edges adjacent to one another to form a closed contour, and the first hinge module is located at a first side edge adjacent to the first body, and the second hinge module is located at a second side edge or a third side edge adjacent to the first side edge.

16. A notebook computer, comprising
a first body;
a second body, having a first display;
a first hinge module, disposed between the first body and the second body, and the second body being rotated relative to the first body via the first hinge module;
a third body, having a second display;
a second hinge module, disposed between the second body and the third body, and the third body being rotated relative to the second body via the second hinge module;
a first electronic module and a second electronic module, disposed in the first body or the second body; and
a switch module, disposed in the first hinge module, the switch module electrically connected to and activating the first electronic module or the second electronic module depending on a rotating state of the first hinge module, wherein the first hinge module comprises:
a first hinge, assembled to the first body;
a second hinge, assembled to the second body, both the first hinge and the second hinge pivotally connected together in a first axial direction, wherein a surface contour of the first hinge facing the second hinge shows varying heights in the first axial direction;
a moving member, movably disposed in the second hinge in the first axial direction and pivoting along with the second hinge, the moving member having a first end and a second end opposite to each other, the first end propped against the surface contour; and
a latch member, rotatably disposed in the second hinge about a second axial direction, the latch member located on a moving path of the second end to be driven to rotate by the moving member,
wherein when the third body is stacked on the second body and rotates relative to the first body to a predetermined state along with the second body, the moving member is driven by the surface contour to rotate the latch member, so that the latch member is engaged in an engaging hole of the third body and the third body is locked onto the second body.

17. The notebook computer as claimed in claim 16, wherein the first axial direction is orthogonal to the second axial direction.

18. The notebook computer as claimed in claim 16, wherein the first hinge module further comprises:
   a restoring member, connected between the latch member and the second hinge, the restoring member permanently driving the latch member to move away from the engaging hole.

19. The notebook computer as claimed in claim 16, wherein the first hinge module further comprises:
   a torque assembly, connected to the first hinge and the second hinge in the first axial direction, the second hinge pivoting relative to the first hinge via the torque assembly.

\* \* \* \* \*